United States Patent
Brummer et al.

[15] 3,665,439
[45] May 23, 1972

[54] OPERATION SUPERVISION SYSTEM FOR AIRPLANES

[72] Inventors: Hans Brummer; Karl Busch, both of Frankfurt, Germany

[73] Assignee: VDO Tachometer Werke, Adolf Schindling GmbH, Frankfurt, Germany

[22] Filed: Apr. 13, 1970

[21] Appl. No.: 27,869

[52] U.S. Cl. .............................340/183, 340/27 R, 340/150
[51] Int. Cl. .........................................................G08b 5/22
[58] Field of Search.............340/150, 183, 266, 324 R, 27 R,

[56] References Cited

UNITED STATES PATENTS

| | | | |
|---|---|---|---|
| 3,541,550 | 11/1970 | Hamre | 340/27 R X |
| 3,132,329 | 5/1964 | Penter | 340/183 |
| 3,518,628 | 6/1970 | Giel et al. | 340/150 X |
| 3,248,650 | 4/1966 | Bialkowiski et al. | 340/183 X |
| 3,145,374 | 8/1964 | Benner et al. | 340/183 |
| 3,376,452 | 4/1968 | Lally | 340/324 X |
| 3,441,740 | 4/1969 | Cloux et al. | 340/266 X |
| 3,217,306 | 11/1965 | Hillman | 340/183 X |
| 3,550,086 | 12/1970 | Ervin | 340/150 |
| 3,525,075 | 8/1970 | Frome et al. | 340/150 |
| 3,364,466 | 1/1968 | Stine | 340/183 X |
| 3,268,665 | 8/1966 | Miller et al. | 340/183 X |

Primary Examiner—David L. Trafton
Attorney—Ernest G. Montague

[57] ABSTRACT

An operation supervision system for airplanes with a plurality of measuring feelers, which comprises means for transforming the measuring values into the form of electrical output signals. Indication devices are coordinated to and are operable by the electrical output signals. Norming members follow the measuring feelers. A multiplex sender is operatively connected with the norming members, and senses cyclically the measuring values normed to standard signals and fed to an analog to digital converter. A multiplex receiver is connected with the output of the analog to digital converter by means of a transmission conduit, and quasi-analog electroluminescent display means are provided to which the multiplex receiver divides the measuring values.

14 Claims, 3 Drawing Figures

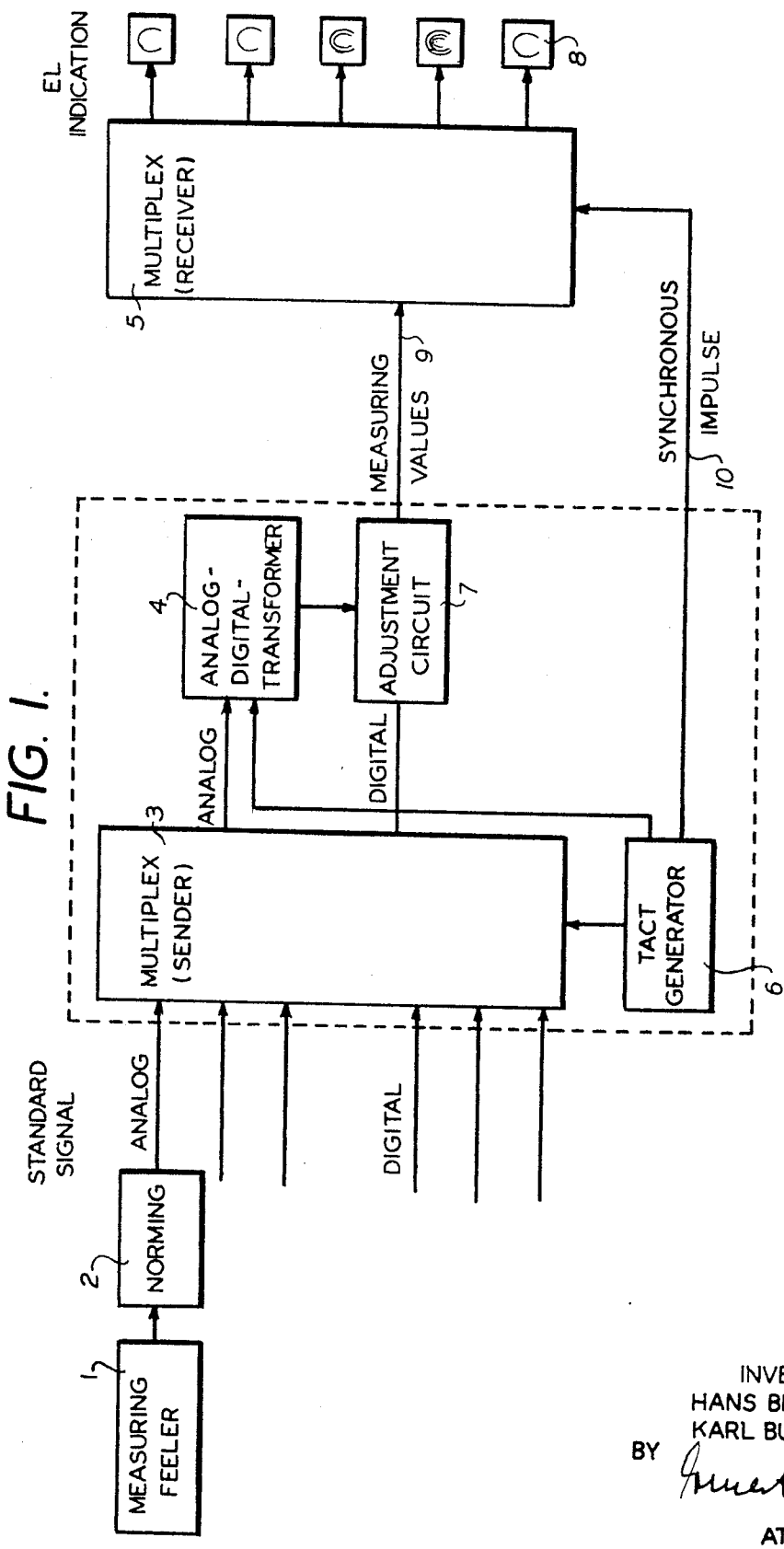

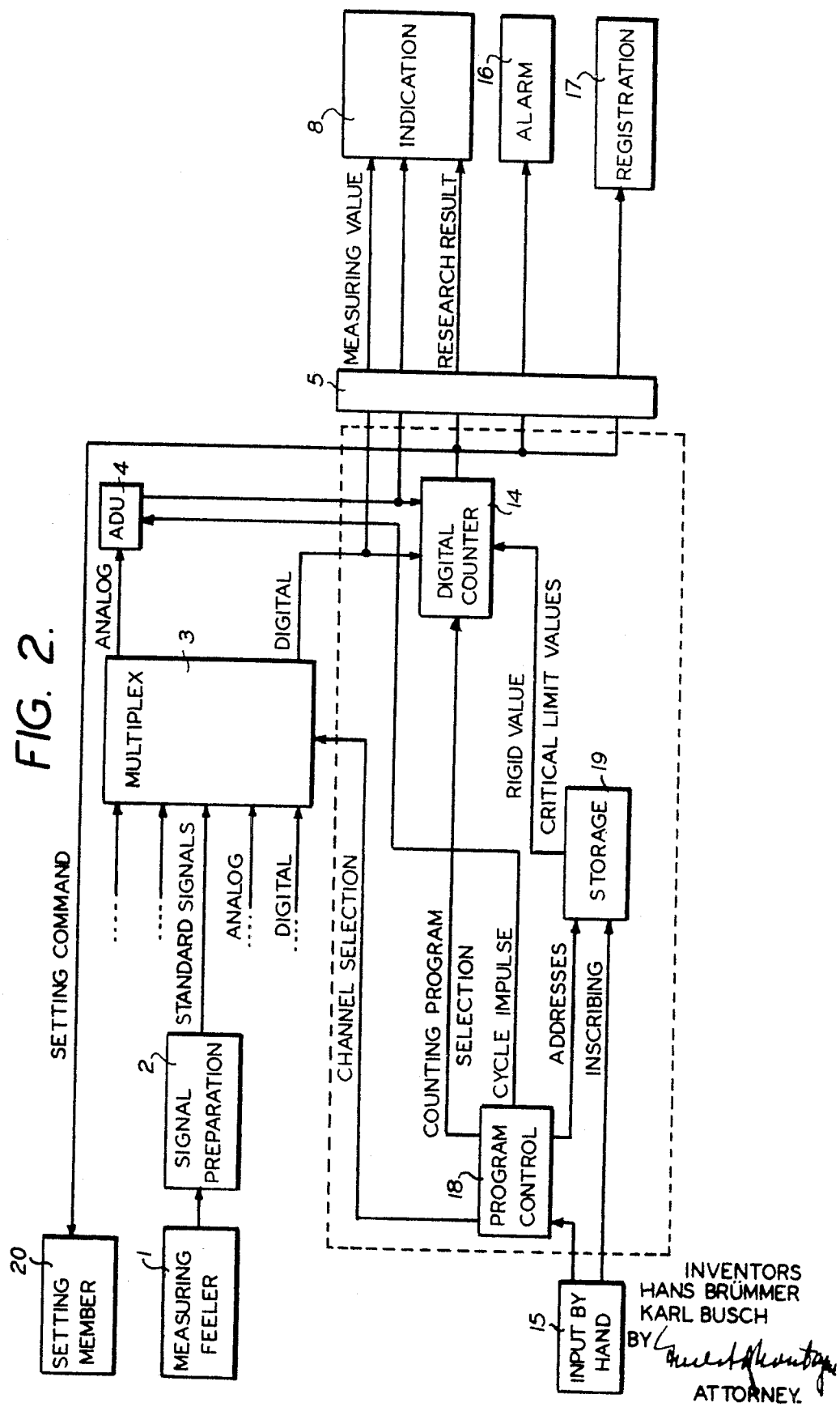

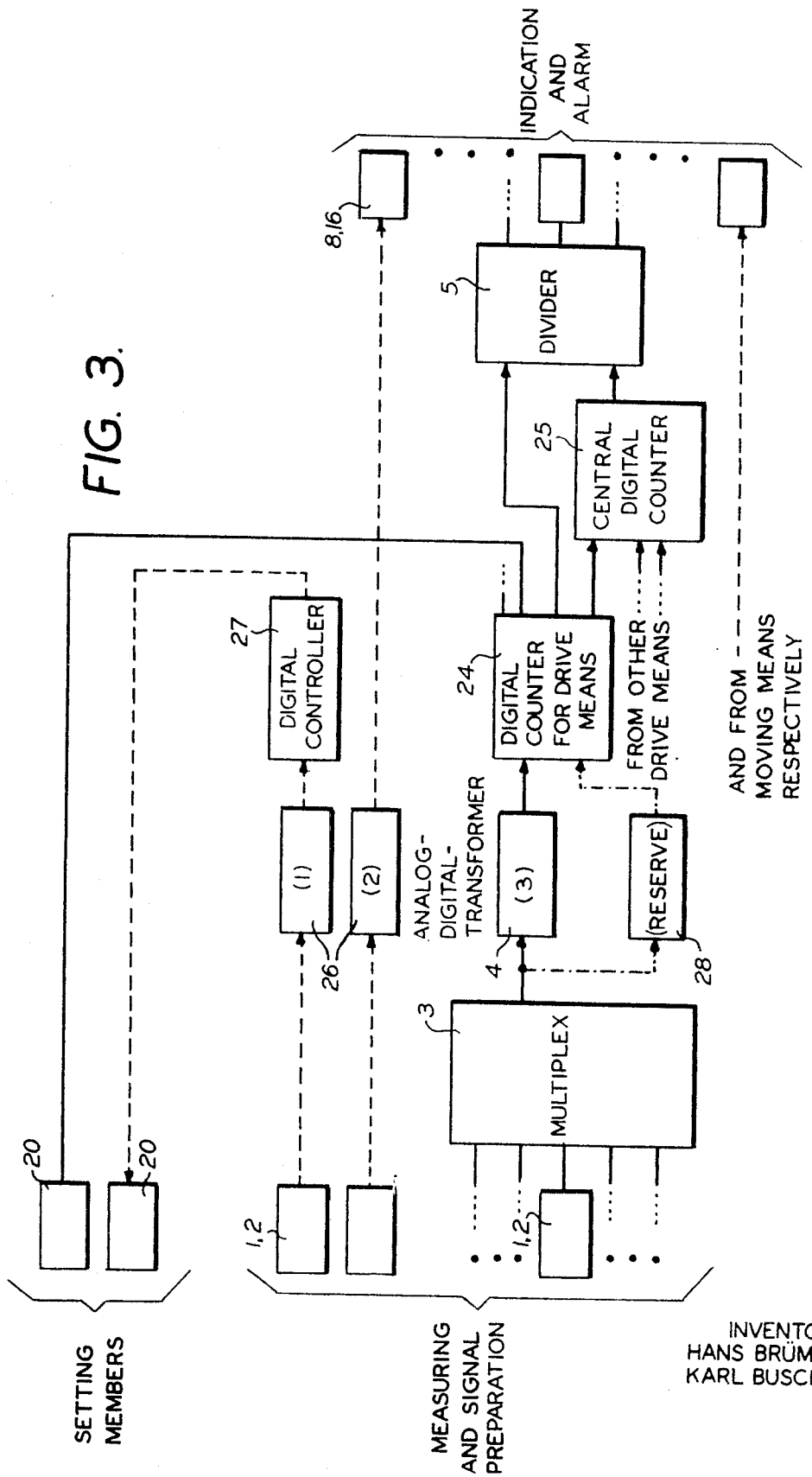

OPERATION SUPERVISION SYSTEM FOR AIRPLANES

The present invention relates to an operation supervision system for airplanes, in general, and to such system having a plurality of measuring feelers, which transform the measuring values into the form of electric output signals, by means of which their coordinated indicating devices are operable, in particular.

The function of operation devices of modern airplanes require during the flight as well as at the start and at the landing a continuous supervision, in order to assure the orderly accident-free performance of the flight. In addition to the navigator devices, particularly the drive means with their auxiliary devices, the flight works and the rolling works must be supervised. By this arrangement, a multiplicity of physical-technical values are to be indicated to the pilot, either continuously or from time to time. With increasing performance capability of the airplanes and their drive means, it was necessary, to approach always closer the load limits of the working material of the drive means and of the cell. Thereby, the importance of the measuring- and supervisory-devices, as well as the requirements to their exactness and reliability was increased, in order to be able to determine and to maintain with safety the required distance from the load limits. Simultaneously, the number of the processes and operational states to be observed increased, so that the observation of the instruments, which indicate these states, requires the attention of the pilot in always more increased measure.

The measuring value took place until now substantially in an analogous form, to a low extent, however, also by means of numerals. For the analogous indication, first of all, two types of devices are used. The ones are indication instruments connected directly or by means of signal amplifiers to the measuring feelers, as membrane measuring works, moving coil measuring works and cross-coil measuring works, as well as synchro- or rotary- indicator systems, which are mechanically simple, however, comparatively inexact and sensitive against vibrations. The others are servo-driven measuring works, in which an indicator setting motor is driven by means of a follower control. These measuring works have a comparatively high exactness, are, however, heavy, large and expensive and have a high additional power consumption. The mixture of the known types of devices leads in the pilot chambers of modern airplanes to a confusing multiple arrangement, which is still more enhanced by different scale interpretation, type of the measuring value presentation, etc.

The measuring feelers used in the known systems transform the prevailing physical measuring value, by example a pressure, a temperature or a torque into a measuring value signal, by example, a mechanical path, the expansion of a liquid or of an electrical signal. Correspondingly, in known supervision systems, in addition to different indicating devices, also different transmission devices for the transmission of the measuring value signal from the measuring feeler to the indicating device, as for example mechanical rods, pressure conduits and electrical cables are found. Now in the aerotechnic, particularly by application in vertical starters, the weight of the devices is of high importance. Here, upon considering a closed supervision system, it is shown, that the weight of the measuring value transmission devices is often a multiple of that of an indicating device or of a measuring value generator. It results therefrom, that for the optimum of a supervisory system, the total of the measuring chain comprising a measuring value generator or measuring feeler, measuring value-transmission element and signal-transmission element, respectively, and the measuring value indication are to be considered.

It is, therefore, one object of the present invention, to provide an operation supervision system for airplanes, wherein an operation supervisory system for airplanes is created, which offers a high degree of technical completeness concerning toughness, reliability, exactness, weight and space requirement and which puts possibly little requirements for the operation by the pilot.

It is another object of the present invention, to provide an operation supervision system for airplanes, wherein standard members follow the measuring feelers, a multiplex sender is connected with the standard members, which multiplex sender senses or feels cyclically the measuring values normed to standard signals and feeds to an analog to digital converter and the output of the analog to digital converter is connected by means of a transmission conduit to a multiplex receiver, which divides the measuring values to quasi-analog electroluminescent display means.

The supervisory system in accordance with the present invention applies a mixture of digital- and analog-technique.

The measuring value signal-transmission and -working takes place in a digital technique, that means, the measuring value is imaged by an impulse sequence, whereby the value of the measuring amount is determined by the number of impulses per time unit or by use of coded signals by predetermined impulse constellations. Since the digital signal is characterized by two clearly distinguishable amplitude steps, "zero" and "one," the tension variations and non-linearities play practically no part as the main error sources of analogous systems. Distortions of the impulse form can be generally compensated again. The two preferred positions of the digital system reduce the power consumption relative to the analog technique, because the switching steps are in the resting positions in the states of a minimum energy consumption. This increases again the reliability, which is a function of the excess temperature of the structure elements. By the low power consumption and the thermal conditions caused thereby, the digital technique is furthermore better suited for a miniature technique.

By a quasi-analog electroluminescent display means in the present instance an indicating device is to be understood, which has a scale divided into a greater number of part members and also quantized, the part members of the scale can be brought to visually determinable variations, in particular to lighting-up individually or in a continuous succession of predetermined duration. Such indicating device is digital for the system and has therefore, the advantages of digital systems. That means the indicating device does not have to be gauged and not equalized. No zero point variation is present. The scale characteristic is linear or can be selectively distorted in a simple manner. By norming, a relation value can be introduced, for example, the nominal value or maximum value being equal to 100 percent. For the observer, the indication is, however, practically analog and offers accordingly simultaneously also the advantages of analog indications. This means, that the reading is simplified, since in form of the scale a reference value is present (orienting reading). The variation tendency of the measuring value is clearly recognizable. A comparison of measuring value is simple and can be performed at any moment.

The indication devices which are designed of rigid-body elements, for example, electroluminescence-cells or injection light sources (light diodes) have no mechanically movable parts. They are, therefore, independent from oscillations, rigid against vibrations, non-sensitive as to temperature, robust and reliable. Errors caused by inertia- or friction-forces are not present. The quasi-analog electroluminescent display means used in accordance with the present invention can be designed without difficulties unitary in their outer structure. By this arrangement, the best observation can be created in the pilot chamber. By the use of unitary device types in addition the servicing is appreciably simplified.

A further advantage resides in the fact that numerical indications can be drawn into the indication face, in a simple manner, for example, in case of round instruments in the center, since there, the indicating axis and the indicator or pointer itself can be omitted. Preferably, for the numerical indications likewise rigid body indication devices are used, that means devices with selectively excitable light cells, which are grouped on the indication face in such manner, that they permit the showing of numerical and alpha-numerical indices. The quasi-analog indication can serve the purpose of delivering a clear rough indication, but the numerical indication makes possible, if required, a more exact measuring value reading.

Based on the standardizing of the output signals of the measuring feelers, the signal transmission can take place by means of parallel-series transformers in the time- or frequency-multiplex process. Because the analog to digital converter is disposed in the transmission-chain behind the multiplex generator or sender, only one such transformer is required for the total system. This is of particular advantage in view of the total consumption of the system, since the analog to digital converter determines the exactness obtainable at the output of the digital transmission systems and accordingly must live up to high requirements.

In a further development of the present invention additional measuring values arriving already digitally from the multiplex generator are likewise taken up and arranged behind the analog to digital converter by means of an adjustment circuit into the output signal sequence of the analog to digital converter.

Preferably, the multiplex generator and the analog to digital converter are disposed in the neighborhood of the measuring stations (for instance the drive means) and the multiplex receiver in the neighborhood of the indication devices (pilot chamber). It is rendered possible thereby, to transmit all measuring values over one conduit, for example, a high valued coaxial cable. The multiple cables present in known systems amount to two to five leads for each indication device and the complementary separation plugs, as well under circumstances, individual amplifiers disposed in the transmission channel can be omitted.

It is particularly suitable, if the multiplex generator and the multiplex receiver are formed as time multiplex devices. Compared with frequency-multiplex-systems, this has the advantage, that, not as there, disturbing mixture frequencies can occur by non-linearities in the transmission path and that oscillatory circuits and band filters, the adjustment of which is difficult to the peripheral conditions required for airplanes, can be avoided. Different from frequency-multiplex-system, time multiplex systems can be realized throughout with the structure elements of the digital technique.

In order to obtain a continuous indication, storage devices are coordinated preferably to the indication devices, which storage devices secure the measuring values between successive sensings.

As has been indicated above already, the quasi-analog indication devices have advantageously often a plurality of electrically excitable electroluminescent display cells disposed in a band-shaped succession, which cells are excitable by means of semi-conductor switching elements selectively operable corresponding with the arriving measuring values. As light cells can be used electroluminescence cells, injection light sources (GaP- and GaAs diodes), glow discharge cells, miniature incandescent lamps and crystal- or liquid-cells with a color layer. Upon evaluation of these cells for acceleration non-sensitivity, mechanical dimensions, light output, power requirement, time constant and technical realization, the electroluminescence cells are preferred at the present time. These comprise in principle a plate condenser with an illumination material (for example with copper or manganese activated sulfide of zinc) as a dielectric and a transparent electrode, which can be excited to light emission upon application of an alternating voltage. During the further development also injection light sources could be of practical interest. Basically equal light cells, as for the quasi-analog indication, can be provided also for the numerical indication.

Until now, measuring values as pressure, number of revolutions, temperature or pressure- and number of revolutions-ratios, have been individually indicated. From the indicated values the pilot determines then the values required for the performance of the prevailing flight task. By example, from the indicated parameters, conclusions can be drawn about the shearing force of the driving means.

The operation supervision system, in accordance with the present invention, in which the measuring value signals are present for digital form in a sensing system, can be further developed in a particularly advantageous manner such, that between the multiplex generator and the multiplex receiver is provided at least one digital counter. By such counter, a plurality of measuring value signals can be combined without any difficulty in the manner performed until now by the pilot, that means the counter can calculate substitute values from the individual parameters, whereby the pilot is appreciably relieved. The counter supports the pilot by a preliminary decision. Furthermore, it can be a part or a control cycle, which effects the drive works.

In most cases, it will suffice to indicate only the substitute value for the individual values. This integration of the individual indications leads to a particularly well-ordered, quickly observable information picture. It is, however, generally advisable, to permit observation of the individual parameters by the counter concerning tolerance-exceedings and to attach an alarm device to the counter, which alarm device is operated, if such exceedings occur. By this arrangement, it is avoided, that non-permissible nominal- actual value-deviations remain non-observed, because they have compensated each other under circumstances during the calculation of the substitute value.

A plurality of operational values are any way of interest only, if they have non-permissible large deviations from the nominal value. This observation can likewise be taken over by the counter. Tolerance-exceedings can then be indicated in a central warning panel. This indication can be combined with a command to the pilot.

Upon presence of a plurality of driving means, a particular drive means counter can be coordinated to each drive means. The substitute values, determined by the drive means counters, can be fed to a central digital counter. The latter can be arranged such, that, at first, it assumes completely or partly, upon loss of a drive means counter, the task of the latter and that, also, data are calculated, which gave information about the totality of the drive means, for example about the total shearing force, the sum of the fuel consumption of all drive means and the like.

Furthermore, also nominal value variations based on varied ambient conditions can be calculated and thereby new guiding values and setting orders for control circuits can be determined (adaptive system).

The operation supervision system according to the present invention permits also an additional particularly advantageous extension in the direction of servicing. Until now the drive means, for example turbines had to be serviced and exchanged, respectively, after predetermined flight time periods. The permissible time period results thereby from experience values. In this procedure short-timed replacements could not be avoided, yet on the other hand, would it be also possible often to operate safely the turbine longer than for the predetermined flight time period. The cause for the premature removal of turbines and of turbine parts, respectively, are extensively known. This is required substantially in case of thermo-shocks, excess numbers of revolutions, bearing vibrations and blade oscillations. The operation supervision system, in accordance with the present invention, permits to retain the particular values, to evaluate by the counter correspondingly its influence on the lifetime of the turbine and then to feed the evaluated values to a registration device connected with the counter. The notations on the registration device delivers then reliable informations to the operator about the actual lifetime of the turbine and the flight time period still to be expected, respectively.

It is suitable for safety reasons to care for a sufficient redundance. For example, the central transmission conduit, the analog to digital converter and other important central structural parts or structural groups can be provided in duplicate or in a multiple manner.

With these and other objects in view, which will become apparent in the following detailed description, the present invention, which is disclosed by example only, will be clearly understood in connection with the accompanying drawings, in which:

FIG. 1 is a circuit diagram disclosing in principle an operation supervision system according to the present invention;

FIG. 2 is a diagrammatic circuit disclosing an extension of the system disclosed in FIG. 1; and FIG. 3 is a structural diagram of the system of the present invention with emergency circuits.

Referring now to the drawings, and in particular to FIG. 1, for a better and clearer showing, only one single measuring feeler 1 is shown. It is to be understood, that practically a plurality of such measuring feelers will be present. Thus, in the drive means supervision, two types of measuring values are determined. One type provides measuring values of the first order, which describe changes in particularly endangered structural parts, and which permit an information over the still permissible operational time limit of the turbine. The other type conveys measuring values of the second order, which submit the informations for the optimum setting with consideration of the flight state. To the measuring values of the first order belong oscillations of the turbine shaft, the pressure of the critical compressor step, combustion chamber temperature, turbine temperature, bending strain of the compressor blades, a radial split in the compressor housing, the fuel flow and the fuel pressure. Measuring values of the second order are the numbers of revolutions of the compressor, air entrance temperature, after burner temperature, fuel temperature, shearing force, torque and angle of the nozzle position.

The measuring feeler 1 comprises in addition to the actual measuring value receiver a measuring value transformer, which transforms the measuring feeler output into an electrical output signal, as much as the measuring value receiver does not deliver any way an electrical output signal. Measuring feelers for the reception of the above-stated measuring values are known.

A norming member 2 follows each measuring feeler 1, which norming member 2 norms the measuring value to a standard signal. The norming members can be formed of reducers or of amplifiers. The normed measuring values are sensed cyclically by means of a multiplex generator or sender 3, and are fed to an analog to digital converter 4. The multiplex sender 3 is, as the multiplex receiver 5, in principle, a rotating switch, in which the mechanical contacts are replaced by rigid-body-structural elements. For the control of the multiplex sender 3 and the multiplex receiver 5 is provided a tact generator 6. At the output side of the analog to digital converter 4 appear the measuring values timely following each other as impulse groups, the code of which depends upon the structure of the transformer.

Incoming measuring values, arriving under circumstances already in digital form, are likewise taken up by the multiplex sender 3 and arranged behind the analog to digital converter 4 by means of an adjustment circuit 7 into the impulse groups. These impulses are then fed to the multiplex receiver 5, moving synchroneously to the multiplex sender 3 and divided from the multiplex receiver 5 to the corresponding, quasi-analog and/or numerical electroluminescent display means 8, of which five are indicated in FIG.1. The indication devices 8 contain storage means, which secure the measuring values between successive sensings. The feeler time period depends upon the coding-speed of the analogous-digital-transformer 4, the sensing frequency to the signal frequency to be transmitted. The sensing frequency must be at least double as high, as the highest signal frequency to be transmitted.

If the device group multiplex sender 3, analogous-digital-transformer 4, tact generator 6 and adjustment circuit 7 are arranged in the vicinity of the measuring stations, for example of the turbine, and the multiplex receiver 5 in the vicinity of the indication instruments 8, all measuring values can be transmitted over a single transmission conduit 9, for example a co-axial cable. In addition, only one synchronization conduit 10 is required, which connects the contact generator 6 for transmission of the synchroneous impulses with the multiplex receiver 5.

As an analog to digital converter, basically any known analog to digital converter can be applied, for example, transformers working according to the saw-tooth principle, which produce by means of a voltage comparison an impulse succession with an impulse number proportional to the measuring voltage, or an analog to digital converter in form of step compensators, by which at the end of a comparison procedure, the coded output signal is obtained by coding for the prevailing switch position. By corresponding step arrangement of the compensation resistances, in the last mentioned case, any selected code can be produced.

Referring now again to the drawings, FIG. 2 discloses an operation supervision system, in which a digital counter 14 is disposed between the multiplex sender 3 and the multiplex receiver 5. The block-scheme shows the information flow between the data sources, namely the measuring feelers 1 and the manually feeding devices 15, on the one hand, and the data users in form of indication devices 8, an alarm panel 16 and registration device 17, on the other hand. To the feeding by hand count in addition to the feed of the rigid- and limit-values necessary for the programming of the system and the command list over a key board, by perforated cards of the like, also the nominal value indications, for example, by the setting of the gas lever by the pilot.

The signals released by the measuring feelers 1 are treated in the norming members 2. It is again assumed, that measuring feelers with digital, as well as such with analogous output are present. The signals are switched through in accordance with the art of signaling over a digital or an analog channel of the multiplex sender 3. The digital signals arrive directly at the digital counter 14, while the analogous signals run over the analog to digital converter 4, which transmits same in digital form to the counter 14.

By means of a program control 18, are the multiplex sender 3 and the multiplex receiver 5, synchroneously arranged, the corresponding rigid- and limit-values are taken from a storage member 19, the counter program is selected and the counter results are distributed over the indication devices 8, the alarm panel 16 and registration device 17. The alarm panel 16 calls attention to tolerance-surpassing. In the registration device 17, the depicted measuring values of the first order are retained. The digital counter 14 is used simultaneously as a member of control circuits. Setting commands obtained by the counter move to setting members 20.

Referring now again to the drawings and in particular to FIG. 3, a structural scheme of the system of the present invention in combination with emergency circuits with application of drive means counters 24 coordinated to the individual drive means and a central digital counter 25 are disclosed. The pointed lines show examples for emergency circuits upon omission of a drive means counter 24 and the point-dotted lines show an emergency circuit for the omission of the analog to digital converter 4.

By the use of individual drive means counters 24, it is assured, that each drive means is capable of functioning per se. In order to permit further functioning to the necessary extent upon omission of a drive means counter, the control of the turbine and the indication, important control- and indication-circuits are formed in a decentralized manner. Auxiliary-analog to digital converter 26 and digital controls 27 serve this purpose, which for example, retain either the last set or a median nominal value independently from a control by the counter. The arrangement can be taken also such, that the central counter 25 assumes at least a part of the tasks of the omitted drive means counter.

The analog to digital converter 4 is arranged parallel to a reserve transformer 28, in accordance with FIG. 3, which reserve transformer 28 becomes operative upon omission of the transformer 4.

While we have disclosed several embodiments of the present invention, it is to be understood that these embodiments are given by example only and not in a limiting sense.

We claim:

1. An operation supervision system for airplanes, comprising
   a plurality of measuring feelers, including means for transforming measuring values into the form of electrical output signals,
   norming members following and coordinated to said measuring feelers, respectively,
   a multiplex sender operatively connected with said norming members,
   an analog to digital converter connected to said multiplex sender, the latter cyclically sensing the measuring values normed to standard signals and fed to said analog to digital converter,
   a multiplex receiver connected with the output of said analog to digital converter by means of a transmission conduit, and
   quasi-analog electroluminescent display means coordinated to said multiplex receiver such that the latter divides said measuring values.

2. The operation supervision system, as set forth in claim 1, which includes
   numerical indication devices in addition to said quasi-analog electroluminescent display means.

3. The operation supervision system, as set forth in claim 1, further comprising
   an adjustment circuit connected to an output of said multiplex sender and to the output of said analog to digital converter, and
   said multiplex sender receives and emits additional, digital measuring values and is arranged behind said analog to digital converter, said adjustment circuit in the output signal succession of said analog to digital converter.

4. The operation supervision system, as set forth in claim 1, wherein
   said multiplex sender and said analog to digital converter are disposed in the vicinity of the measuring feelers, and
   said multiplex receiver is disposed in the vicinity of said display means.

5. The operation supervision system, as set forth in claim 1, wherein
   said multiplex sender and said multiplex receiver are formed as time-multiplex devices.

6. The operation supervision system, as set forth in claim 4, which includes
   storage members coordinated to said display means, which retain the measuring values between successive sensings.

7. The operation supervision system, as set forth in claim 1, wherein
   said quasi-analog electroluminescent display means have a plurality of electrically excitable electroluminescent light cells disposed in a band-shaped succession,
   semiconductor switching elements selectively operable by means of the arriving measuring values, and
   said light cells being excitable by means of said semiconductor switching elements.

8. The operation supervision system, as set forth in claim 1, which includes
   at least one digital counter disposed between said multiplex sender and said multiplex receiver.

9. The operation supervision system, as set forth in claim 8, wherein
   said counter combines predetermined combinations of measuring values to substitutes.

10. The operation supervision system, as set forth in claim 8, which includes
    an alarm device connected to said counter, said alarm to be adapted to be operated, if predetermined measuring values or measuring value combinations surpass a pre-set tolerance.

11. The operation supervision system, as set forth in claim 8, which includes
    means for indicating predetermined measuring values by said counter only upon reaching present critical limit values.

12. The operation supervision system, as set forth in claim 8, which includes
    means for supervision of a plurality of drive means, and
    a particular drive means counter is coordinated to each drive means.

13. The operation supervision system, as set forth in claim 12, which includes
    a central digital counter which combines predetermined output values of said individual drive means counters to substitutes.

14. The operation supervision system, as set forth in claim 8, which includes
    a registration device connected with said counter, which registration device indicates predetermined output values of said counter.

* * * * *